Patented Mar. 16, 1937

2,073,630

UNITED STATES PATENT OFFICE 2,073,630

LIQUID WATERPROOFING COMPOSITION OF MATTER AND METHOD OF MANUFACTURE

John Herman Gardthausen, Long Island City, N. Y., assignor, by mesne assignments, to Drigard Products Corporation, a corporation of Delaware No Drawing. Application December 15, 1934, Serial No. 757,609. Renewed June 2, 1936

8 Claims. (Cl. 134—17)

My invention relates to a liquid composition of matter and more particularly to a liquid waterproofing composition having superior water repellent properties, and its method of manufacture. This composition is translucent, practically colorless, and has a consistency similar to that of light lubricating oil. The composition may be utilized for various waterproofing purposes. When applied to leather, fabrics, paper, etc., it does not deleteriously affect their flexibility or other natural properties, but renders them water repellent throughout their useful life. In these respects my composition distinguishes from and constitutes a marked improvement over the large majority of the prior art compositions utilizing waxes, resins, and heavy oils as their main constituents. Such compositions form thick, colored, coatings on the outer surfaces of materials to which they are applied and these coatings effect substantial undesirable changes in the color, flexibility, and other natural properties of the materials so treated.

A prominent feature of my new composition consists in its use as a vehicle or liquid medium for paints and varnishes. When used for this purpose the composition functions in a dual manner, that is, it acts as a solution or suspension medium for the paint pigment or varnish base, and effects also the additional and highly useful result of rendering the finished paint and varnish entirely waterproof.

As explained in detail hereinafter, my composition possesses as one of its principal constituents a substantial amount of rubber in fluent form. By using this composition as a vehicle, I have made it possible to introduce into paints substantial amounts of rubber and thereby produce a rubber base paint of real merit.

The problem of producing a rubber type of paint has confronted the paint industry for many years and numerous attempts have been made to develop some means or process for incorporating the rubber into either the paint vehicle or into the final paint product. From a practical standpoint, these attempts have all been unsatisfactory, as shown by the absence from the market and public use of paints containing any substantial percentage of rubber. In some few instances the prior art methods have been successful in incorporating into paints very limited amounts of rubber. The actual amount of rubber so introduced, however, is practically negligible and insufficient to produce any real beneficial effect. The greatest difficulty that has been encountered thus far in making rubber paints, varnishes, etc., is the nonfluent character of the rubber when incorporated in such liquids. In most of the liquid coating materials, the rubber does not flow easily but tends to collect in small jelly-like masses, and such formations inhibit the necessary brushing or flowing properties of the paint or other coating type of liquid.

The introduction of rubber into paints and other coating compositions has been greatly desired due to the fact that the rubber, if properly associated with the other ingredients, would substantially increase the water repellent properties of the coating composition and also render it more adhesive in character. These two desired properties would reduce the tendency of the paint, upon ageing, to chip or otherwise become separated from the surface to which it is applied, and would prevent water from reaching and penetrating the painted materials. It is a recognized fact that the present paints, varnishes, etc., are deficient in this respect and do not entirely prevent the deterioration of materials commonly caused by moisture.

In accordance with my invention, I have overcome the deficiencies and limitations of the prior art and have produced a liquid composition that may be used either by itself for waterproofing numerous materials, or may be used as a vehicle in coating compositions. In the latter case it is associated with other water repellent substances, such as pigments, resins, etc., to produce waterproof paints, varnishes and other coating compositions. The final paint or varnish product in which my waterproofing composition is present and acts as a vehicle or liquid carrying medium for the solid constituents, naturally possesses the strong water repellent properties of the composition per se. Such products therefore possess all of the desirable properties of paints and other coating materials, such as body and color, and in addition possess the even more desirable property of being waterproof.

An object of my invention is to provide a liquid waterproofing composition that is capable of rendering materials, to which it is applied, water repellent without adversely affecting any of the natural, desired properties of the materials.

Another object is to provide a liquid composition of matter that may be utilized as a vehicle or liquid medium for waterproof paints, varnishes, and other liquid coating compositions.

The composition characteristic of my invention, which I have utilized for waterproofing various materials and also as a vehicle in the production of waterproof paints, etc., with satisfactory results, consists generically of a hydrogenated oil, rubber in liquid form, and at least one light hydrocarbon distillate. I have discovered that when materials of this type are mixed or combined in the proper manner and proportions, a new composition of matter, particularly useful for the above described purposes, is obtained. This composition possesses unusual and unexpected water repellent properties and is not subject to the undesirable characteristics of the prior art compositions mentioned above.

In preparing this waterproofing composition I have found it advantageous to employ the materials and approximate proportions given in the following formula:

|  | Per cent |
|---|---|
| Hydrogenated fish oil | 7.5 |
| Crude rubber | 2.5 |
| Light hydrocarbon distillates (e. g. Varsol and Xylol) | 90.0 |
|  | 100 |

I believe that the above waterproofing composition of my invention is a true composition of matter. The several ingredients comprising this composition, when properly brought together, coact in such a manner that a product results having new and different characteristics of its own. The waterproofing efficiency of the resultant composition is not possessed by any one of its constituents taken individually nor is it characterized by a simple addition or accumulation of the individual waterproofing ability of each of the incorporated substances.

With regard to the use of this composition as a vehicle for waterproof paints and the like, it is important to note that the separate ingredients of the composition cannot be individually introduced into paints with the same satisfactory results that I obtain by utilizing the prepared composition as the vehicle. More specifically, the hydrogenated fish oil, if incorporated into paints, will increase the water repellent properties of the paint to some extent, but will not be nearly as effective as my composition. The rubber alone cannot be satisfactorily introduced into paints, for as mentioned above, it substantially destroys the necessary brushing and flowing properties of the paint. However, when the rubber and hydrogenated fish oil are intimately associated in accordance with my invention so that they co-act with the solvent to form a new composition of matter, such composition is a suitable vehicle for paints and accomplishes the purpose of increasing the water repellent properties of the paint. Through the intermediary of this vehicle substantial amounts of rubber can be successfully incorporated into the paint and a greatly improved paint product thereby obtained.

My composition of matter is particularly characterized by the intimate association of the hydrogenated fish oil with the rubber. The hydrogenated fish oil is easily dispersed in the light hydrocarbon distillates, which I use, and apparently has the property of stabilizing the rubber that is liquefied and dispersed in these liquids. In other words, the hydrogenated fish oil and rubber have coacted in the solvent to form a new composition in which the rubber does not have the usual tendency to settle out but is held in a stable condition by reason of the presence of the hydrogenated fish oil. Consequently the composition is highly fluent and possesses the flowing and brushing qualities necessary for use in paints and other coating compositions.

When my composition is applied to any porous material the light hydrocarbon distillates, which act initially as liquefying and suspension agents for the rubber and hydrogenated fish oil, permit the liquid composition to penetrate deeply into the interstices of pores of the material. Upon evaporation of the distillates the hydrogenated fish oil and rubber, intimately associated, deposit as a water repellent base. In addition to this impregnating action, a small portion of the composition, upon evaporation of the volatile distillates, deposits in the form of a very thin film on the outer surface of the treated material. The combination of these two effects renders the treated material waterproof.

When it is desired to use my composition as a vehicle for making waterproof paints, varnishes, etc., this may be done in substantially the same manner employed when the ordinary types of vehicles are used. For example, a waterproof paint may be made by grinding any one of the well known paint pigments with a suitable drying oil, adding to this mixture one or more of the common inert extenders, such as talc or barytes, and then thoroughly mixing these ground materials with my liquid composition in proper proportions to give the desired consistency. If desired the drying oil may be omitted and the pigment and extender ground directly with my composition. If this is done the percentage of the solid constituents, namely, the hydrogenated fish oil and rubber, is increased to give the composition the necessary body or consistency.

The preparation of my liquid composition of matter may be very easily carried out in the following manner. The light hydrocarbon distillates, e.g., Varsol and Xylol, are heated together to a temperature of approximately 150° F. and the crude rubber is placed in the heated liquid mixture. The rubber may be put in one large piece or if quicker action is desired it may be previously cut up into a number of smaller pieces. The mixture is maintained at the temperature of approximately 150° F., accompanied by mechanical stirring or agitation of some type, until the rubber absorbs a sufficient amount of the distillates to reduce it to a flowing liquid form. This much of the process may be performed in the cold, that is, at room temperatures, if desired, although the dissolving of the rubber will be effected in much shorter time if the liquids are heated. After the rubber has become thoroughly liquefied in this medium, the hydrogenated fish-oil is added and the resultant heated mixture of solvents, rubber, and hydrogenated fish oil is agitated until the fish oil and rubber have become very intimately associated with each other.

The solvents used in my composition may be any of the suitable light hydrocarbon distillate types, and I find that those sold under the trade names of Varsol and Xylol give satisfactory results. I have also found that the terpentine commonly used as a paint diluent is a satisfactory solvent for my purpose and may be substituted for or used in addition to the Xylol and Varsol solvents. The hydrogenated fish oil is in solid form and is somewhat oleaginous in character. It is preferably ground or cut up into small flakes before introduction into the mixture of rubber and solvents. The tetra-hydrogenated fish oil sold under the name of "Solesterole" gives very satisfactory results when used in accordance with the above process.

It is to be understood that the doctrine of equivalents applies with full force and effect to this application and that various modifications obvious to those skilled in the art may be made without departing from my invention, the scope of which is to be limited only by the appended claims.

What I claim as new is:

1. A translucent liquid waterproofing composition of matter consisting of approximately 7.5% hydrogenated fish oil, 2.5% rubber and 90% light hydrocarbon solvents.

2. A waterproofing composition of matter comprising intimately admixed hydrogenated fish oil and rubber suspended in at least one light hydrocarbon distillate in such proportions as to form a material suitable for spraying, dipping and brushing.

3. A waterproof coating composition comprising an intimate admixture of rubber, hydrogenated fish oil, a light hydrocarbon distillate, a mineral pigment and a drying oil mixed in such proportions as to form a material suitable for spraying or brushing.

4. A waterproofing composition comprising rubber, hydrogenated fish oil, a pigment, and a hydrocarbon solvent, mixed in such proportions as to form a material suitable for spraying or brushing.

5. A waterproofing composition comprising rubber, hydrogenated fish oil, an inert extender, and a solvent mixed in such proportions as to form a material suitable for spraying or brushing.

6. A waterproofing composition comprising rubber, hydrogenated fish oil, a drying oil, and a solvent mixed in such proportions as to form a material suitable for spraying, dipping or brushing.

7. A waterproofing composition comprising hydrogenated fish oil and a hydrocarbon solvent mixed in such proportions as to form a material suitable for spraying, dipping, and brushing.

8. A composition of matter comprising hydrogenated fish oil, rubber and a compatible solvent, intimately associated and in such proportions as to form a material suitable for waterproofing.

JOHN HERMAN GARDTHAUSEN.